US010909405B1

(12) United States Patent
Golard et al.

(10) Patent No.: US 10,909,405 B1
(45) Date of Patent: Feb. 2, 2021

(54) VIRTUAL INTEREST SEGMENTATION

(71) Applicant: Facebook Technologies, LLC, Menlo Park, CA (US)

(72) Inventors: Andre Golard, Seattle, WA (US); Bo Asp Andersen, Seattle, WA (US); Immo Andreas Schuetz, Redmond, WA (US); Karol Constantine Hatzilias, Kenmore, WA (US); Kelly Ingham, Redmond, WA (US); Martin Henrik Tall, Redwood City, CA (US); Neeraj Choubey, Belmont, CA (US); Sharvil Shailesh Talati, Mercer Island, WA (US); Robert Dale Cavin, Seattle, WA (US); Thomas Scott Murdison, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 50 days.

(21) Appl. No.: 16/290,989

(22) Filed: Mar. 4, 2019

(51) Int. Cl.
  *G06K 9/00* (2006.01)
  *G06K 9/34* (2006.01)
  *G06K 9/72* (2006.01)

(52) U.S. Cl.
  CPC ........... *G06K 9/34* (2013.01); *G06K 9/00624* (2013.01); *G06K 9/726* (2013.01)

(58) Field of Classification Search
  CPC ........ G06T 19/006; G06T 2207/10024; G06N 3/0454; A61B 3/0008; A61B 3/022
  USPC ................. 382/103; 345/633, 629; 705/75; 709/200–205, 217–229
  See application file for complete search history.

(56) References Cited

U.S. PATENT DOCUMENTS

| | | | |
|---|---|---|---|
| 9,219,668 B2 * | 12/2015 | Johnson | H04W 4/021 |
| 9,898,869 B2 * | 2/2018 | Shapira | G06T 19/006 |
| 10,242,501 B1 * | 3/2019 | Pusch | H04N 21/6587 |
| 10,270,748 B2 * | 4/2019 | Briceno | H04L 9/006 |
| 10,521,965 B2 * | 12/2019 | Uchida | G06T 7/70 |
| 2018/0255290 A1 * | 9/2018 | Holzer | H04N 13/279 |
| 2019/0370488 A1 * | 12/2019 | Rajashekaraiah | G06F 21/6245 |
| 2019/0379940 A1 * | 12/2019 | Bentovim | H04N 21/2187 |

* cited by examiner

*Primary Examiner* — Charlotte M Baker
(74) *Attorney, Agent, or Firm* — FisherBroyles, LLP

(57) ABSTRACT

Systems and methods for virtual interest segmentation may include (1) performing a semantic segmentation of an image of a user's environment, captured by an artificial reality (AR) device being worn by the user, to identify objects within the user's environment, (2) in addition to performing the semantic segmentation, performing an interest segmentation of the image to determine a personal interest that the user may have in a particular object identified via the semantic segmentation, (3) creating virtual content relating to the particular object based on the user's personal interest in the particular object, and (4) displaying the virtual content within a display element of the AR device. Various other methods, systems, and computer-readable media are also disclosed.

20 Claims, 6 Drawing Sheets

VIRTUAL INTEREST SEGMENTATION

BACKGROUND

Virtual and augmented reality systems (collectively known as artificial reality systems) are often configured to be worn by a user as the user interacts with the real world. Such artificial reality systems typically include a display element through which the user may see the real world. The display element may additionally be configured to display virtual content such that the virtual content is visually superimposed over the real world within the display element. The variety of content that may be displayed is as vast as the variety of scenes and objects that may be viewed through the display element. As such, it may be difficult to narrow this variety to content that is pertinent to a particular user. If the content is well-tailored to a user, the content can be a powerful addition to the user's interactions with the real world. However, if the content is not pertinent to the user, the content may be an irritating distraction. The present disclosure therefore identifies a need for systems and methods for digitally generating and displaying virtual content to a user wearing an artificial reality system that is personally pertinent to the user.

SUMMARY

As will be described in greater detail below, the present disclosure describes various systems and methods for (1) digitally determining which objects are in an environment of a user wearing an artificial reality (AR) device, and then (2) digitally determining a personal significance that one or more of those objects may have for the user (e.g., by performing a virtual interest segmentation). In one example, a computer-implemented method for performing this task may include (1) performing a semantic segmentation of an image of a user's environment, captured by an artificial reality (AR) device being worn by the user, to identify objects within the user's environment, (2) in addition to performing the semantic segmentation, performing an interest segmentation of the image to determine a personal interest that the user may have in a particular object identified via the semantic segmentation, (3) creating virtual content relating to the particular object based on the user's personal interest in the particular object, and (4) displaying the virtual content within a display element of the AR device (e.g., such that the virtual content is superimposed over the particular object within the display element).

In one example, determining the personal interest may include (1) identifying a type of object corresponding to the particular object and (2) determining that the user is interested in the type of object. In this example, the virtual content may include content configured to draw the user's attention to the particular object.

In another example, determining the personal interest may include determining that (1) the particular object belongs to the user and/or (2) the user has interacted with the particular object more than a threshold amount. In this example, the virtual content may be created and displayed in response to determining that the user has lost the particular object and the virtual content may be configured to indicate a location of the particular object within the environment. In one specific embodiment, the semantic and interest segmentations may be performed at a first moment in time, during which the user wearing the AR device is within the environment while wearing the AR device. In this embodiment, the user may be determined to have lost the particular object at a second moment in time during which the user is no longer within the environment.

In some examples, the interest segmentation may be based on the user's historical eye-tracking data and/or the historical eye-tracking data of one or more additional users with a particular similarity or bundle of similarities to the user. In one embodiment, the interest segmentation may be based on a heatmap of the environment that includes the user's eye-tracking data with respect to the environment. Additionally or alternatively, the interest segmentation may be based on GPS data associated with the user, URL browsing data associated with the user, and/or user-submitted data submitted by the user. In some examples, the interest segmentation may be based on an interaction of the user recorded by an additional device within an Internet of Things (IoT) system that includes the AR device.

In one example, the interest segmentation may be based on data describing ephemeral factors predicted to be affecting a current state of the user (e.g., a time of day, an emotional state of the user, a physiological state of the user, and/or a current activity of the user). In some examples, the interest segmentation may be performed by a neural network. In some embodiments, the interest segmentation may be performed and/or the virtual content may be displayed in response to receiving user permission to do so.

In one embodiment, a system for implementing the above-described method may include (1) a segmentation module, stored in memory, that (i) performs a semantic segmentation of an image of a user's environment, captured by an AR device being worn by the user, to identify objects within the user's environment and (ii) performs an interest segmentation of the image to determine a personal interest that the user may have in a particular object identified via the semantic segmentation, (2) a content creation module that creates virtual content relating to the particular object based on the user's personal interest in the particular object, (3) a display module that displays the virtual content within a display element of the AR device, and (4) a physical processor configured to execute the segmentation module, the content creation module, and the display module.

In some examples, the above-described method may be encoded as computer-readable instructions on a non-transitory computer-readable medium. For example, a computer-readable medium may include one or more computer-readable instructions that, when executed by at least one processor of a computing device, may cause the computing device to (1) perform a semantic segmentation of an image of a user's environment, captured by an AR device being worn by the user, to identify objects within the user's environment, (2) perform an interest segmentation of the image to determine a personal interest that the user may have in a particular object identified via the semantic segmentation, (3) create virtual content relating to the particular object based on the user's personal interest in the particular object, and (4) display the virtual content within a display element of the AR device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the present disclosure.

Figure 1:
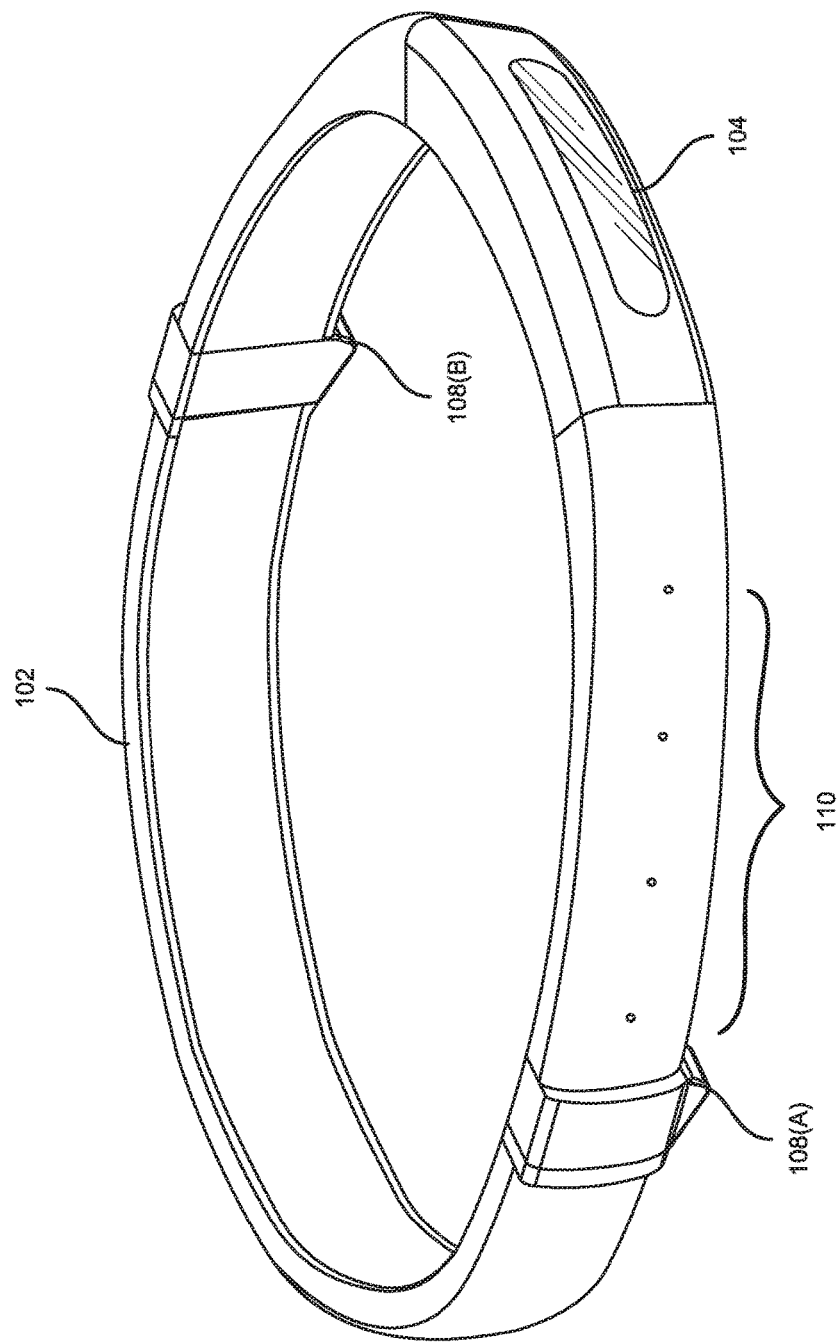
FIG. 1 is an illustration of an exemplary AR system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to (1) digitally determining which objects are in an environment of a user wearing an artificial reality (AR) device, and then (2) digitally determining a personal significance that one or more of those objects may have for the user (e.g., by performing a virtual interest segmentation). A process for performing interest segmentation may include (1) performing a semantic segmentation of an image of a scene (captured by a user's AR device) to identify and label objects in the scene and then (2) digitally analyzing the identified objects to identify a personal significance that one or more of the objects may have to the user. An object may be identified as personally significant to the user for a variety of reasons. Objects of significance might include objects that belong to the user (e.g., the user's phone or keys), objects that are often frequented or used by the user (e.g., a particular park bench), and/or objects that are predicted to be of interest to the user (e.g., electrical outlets in an airport, a certain type of restaurant, or a certain type of musical instrument). After performing the interest segmentation, virtual content relating to the personally significant objects may be created and displayed via the AR device, based on the results of the interest segmentation.

A degree to which the interest segmentation is personalized may vary based on a privacy setting selected by the user. For example, the interest segmentation may be performed by a neural network and the data collected to be used as inputs to the neural network may be limited to types of data that the user has given permission to have collected. Such factors might include (without limitation) the user's historical gaze-tracking and/or hand-tracking data, user preferences submitted by the user, the user's browsing history, contextual factors such as a time of day, and/or a deduced emotional state of the user.

The virtual content may take many different forms and may include a variety of different information. For example, the virtual content may take the form of (1) an alert pointing out an object in an environment of the user that has been predicted to be of interest to the user and/or (2) additional information about an object in the environment that has been predicted to be of interest to the user (e.g., historical information about a building, a cost of a product, an establishment's hours of operation, etc.).

In some embodiments, the interest segmentation may be based at least partially on aggregated historical data collected from other users of AR devices. Users may provide permission for their data to be added to this aggregated data ex ante or post hoc.

As will be explained in greater detail below, embodiments of the present disclosure may improve an AR device's ability to meaningfully present digital content to a user. This may improve the functioning of a computer itself (i.e., an AR device) by increasing the computer's utility.

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof.

Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays, an example of which is AR system 100 in FIG. 1. Other artificial reality systems may include a near-eye display that also provides visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 1, AR system 100 generally represents a wearable device dimensioned to fit about a body part (e.g., a head) of a user. As shown in FIG. 1, system 100 may include a frame 102 and a camera assembly 104 that is coupled to frame 102 and configured to gather information about a local environment by observing the local environment. AR system 100 may also include one or more audio devices, such as output audio transducers 108(A) and 108 (B) and input audio transducers 110. Output audio transducers 108(A) and 108(B) may provide audio feedback and/or content to a user, and input audio transducers 110 may capture audio in a user's environment.

As shown, AR system 100 may not necessarily include a near-eye display positioned in front of a user's eyes. AR systems without near-eye displays may take a variety of forms, such as head bands, hats, hair bands, belts, watches, wrist bands, ankle bands, rings, neckbands, necklaces, chest bands, eyewear frames, and/or any other suitable type or form of apparatus. While AR system 100 may not include a near-eye display, AR system 100 may include other types of screens or visual feedback devices (e.g., a display screen integrated into a side of frame 102).

Figure 2:
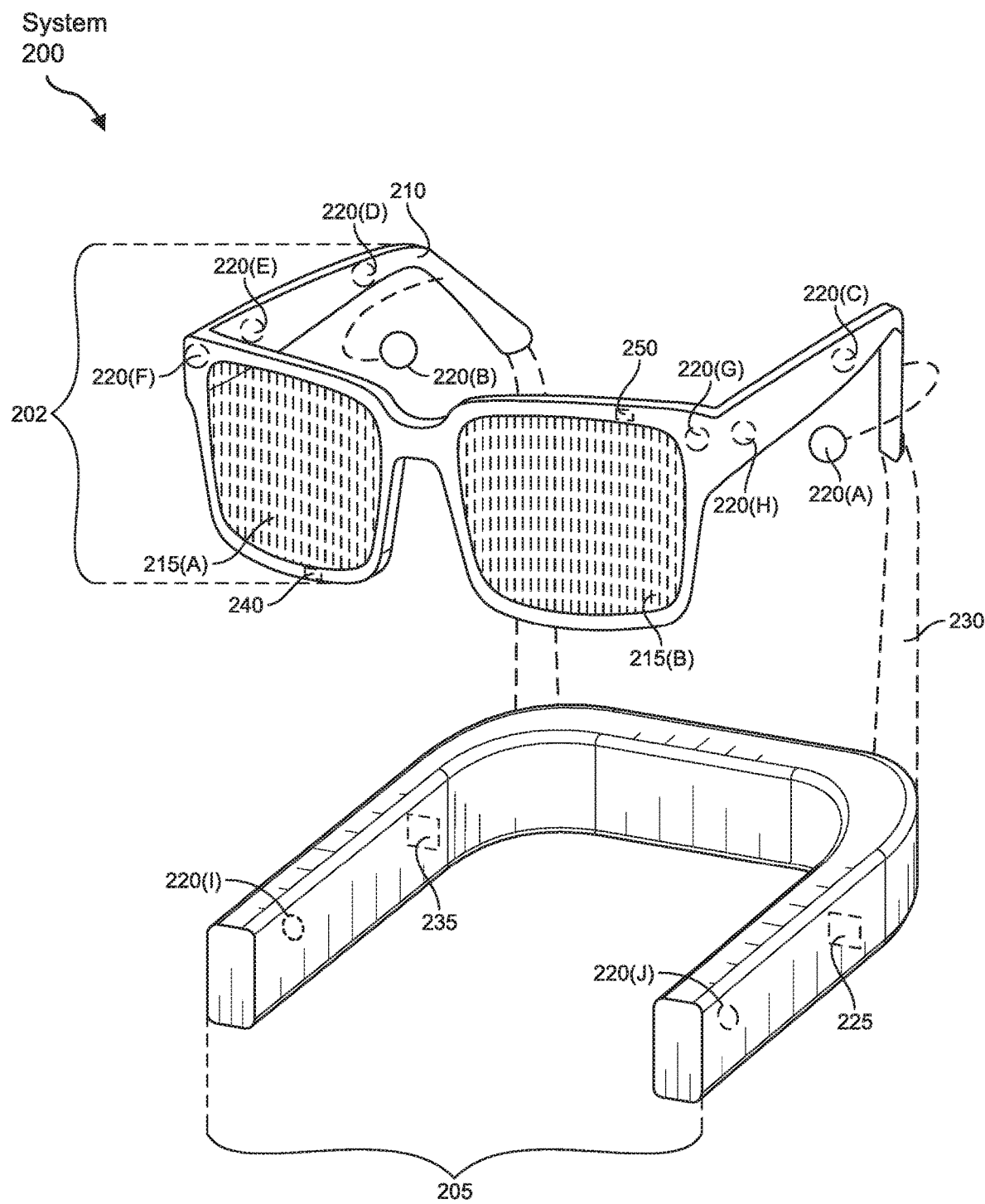
FIG. 2 is an illustration of an additional exemplary AR system.

The embodiments discussed in this disclosure may also be implemented in AR systems that include one or more near-eye displays. For example, as shown in FIG. 2, AR system 200 may include an eyewear device 202 with a frame 210 configured to hold a left display device 215(A) and a right display device 215(B) in front of a user's eyes. Display devices 215(A) and 215(B) may act together or independently to present an image or series of images to a user. While AR system 200 includes two displays, embodiments of this disclosure may be implemented in AR systems with a single near-eye display or more than two near-eye displays.

In some embodiments, AR system 200 may include one or more sensors, such as sensor 240. Sensor 240 may generate measurement signals in response to motion of AR system 200 and may be located on substantially any portion of frame 210. Sensor 240 may include a position sensor, an inertial measurement unit (IMU), a depth camera assembly, or any combination thereof. In some embodiments, AR system 200 may or may not include sensor 240 or may include more than one sensor. In embodiments in which sensor 240 includes an IMU, the IMU may generate calibration data based on measurement signals from sensor 240. Examples of sensor 240 may include, without limitation, accelerometers, gyroscopes, magnetometers, other suitable types of sensors that detect motion, sensors used for error correction of the IMU, or some combination thereof.

AR system 200 may also include a microphone array with a plurality of acoustic sensors 220(A)-220(J), referred to collectively as acoustic sensors 220. Acoustic sensors 220 may be transducers that detect air pressure variations induced by sound waves. Each acoustic sensor 220 may be configured to detect sound and convert the detected sound into an electronic format (e.g., an analog or digital format). The microphone array in FIG. 2 may include, for example, ten acoustic sensors: 220(A) and 220(B), which may be designed to be placed inside a corresponding ear of the user, acoustic sensors 220(C), 220(D), 220(E), 220(F), 220(G), and 220(H), which may be positioned at various locations on frame 210, and/or acoustic sensors 220(I) and 220(J), which may be positioned on a corresponding neckband 205.

The configuration of acoustic sensors 220 of the microphone array may vary. While AR system 200 is shown in FIG. 2 as having ten acoustic sensors 220, the number of acoustic sensors 220 may be greater or less than ten. In some embodiments, using higher numbers of acoustic sensors 220 may increase the amount of audio information collected and/or the sensitivity and accuracy of the audio information. In contrast, using a lower number of acoustic sensors 220 may decrease the computing power required by the controller 250 to process the collected audio information. In addition, the position of each acoustic sensor 220 of the microphone array may vary. For example, the position of an acoustic sensor 220 may include a defined position on the user, a defined coordinate on the frame 210, an orientation associated with each acoustic sensor, or some combination thereof.

Acoustic sensors 220(A) and 220(B) may be positioned on different parts of the user's ear, such as behind the pinna or within the auricle or fossa. Or, there may be additional acoustic sensors on or surrounding the ear in addition to acoustic sensors 220 inside the ear canal. Having an acoustic sensor positioned next to an ear canal of a user may enable the microphone array to collect information on how sounds arrive at the ear canal. By positioning at least two of acoustic sensors 220 on either side of a user's head (e.g., as binaural microphones), AR system 200 may simulate binaural hearing and capture a 3D stereo sound field around about a user's head. In some embodiments, acoustic sensors 220(A) and 220(B) may be connected to AR system 200 via a wired connection, and in other embodiments, the acoustic sensors 220(A) and 220(B) may be connected to AR system 200 via a wireless connection (e.g., a Bluetooth connection). In still other embodiments, acoustic sensors 220(A) and 220(B) may not be used at all in conjunction with AR system 200.

Acoustic sensors 220 on frame 210 may be positioned along the length of the temples, across the bridge, above or below display devices 215(A) and 215(B), or some combination thereof. Acoustic sensors 220 may be oriented such that the microphone array is able to detect sounds in a wide range of directions surrounding the user wearing the AR system 200. In some embodiments, an optimization process may be performed during manufacturing of AR system 200 to determine relative positioning of each acoustic sensor 220 in the microphone array.

AR system 200 may further include or be connected to an external device (e.g., a paired device), such as neckband 205. As shown, neckband 205 may be coupled to eyewear device 202 via one or more connectors 230. Connectors 230 may be wired or wireless connectors and may include electrical and/or non-electrical (e.g., structural) components. In some cases, eyewear device 202 and neckband 205 may operate independently without any wired or wireless connection between them.

While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of eyewear device 202 and neckband 205 may be located on one or more additional peripheral devices paired with eyewear device 202, neckband 205, or some combination thereof. Furthermore, neckband 205 generally represents any type or form of paired device. Thus, the following discussion of neckband 205 may also apply to various other paired devices, such as smart watches, smart phones, wrist bands, other wearable devices, hand-held controllers, tablet computers, laptop computers, etc.

Pairing external devices, such as neckband 205, with AR eyewear devices may enable the eyewear devices to achieve the form factor of a pair of glasses while still providing sufficient battery and computation power for expanded capabilities. Some or all of the battery power, computational resources, and/or additional features of AR system 200 may be provided by a paired device or shared between a paired device and an eyewear device, thus reducing the weight, heat profile, and form factor of the eyewear device overall while still retaining desired functionality.

For example, neckband 205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 205 may be less invasive to a user than weight carried in eyewear device 202, a user may tolerate wearing a lighter eyewear device and carrying or wearing the paired device for greater lengths of time than a user would tolerate wearing a heavy standalone eyewear device, thereby enabling an artificial reality environment to be incorporated more fully into a user's day-to-day activities.

Neckband 205 may be communicatively coupled with eyewear device 202 and/or to other devices. The other devices may provide certain functions (e.g., tracking, localizing, depth mapping, processing, storage, etc.) to AR system 200. In the embodiment of FIG. 2, neckband 205 may include two acoustic sensors (e.g., 220(I) and 220(J)) that are part of the microphone array (or potentially form their own microphone subarray). Neckband 205 may also include a controller 225 and a power source 235.

Acoustic sensors 220(I) and 220(J) of neckband 205 may be configured to detect sound and convert the detected sound into an electronic format (analog or digital). In the embodiment of FIG. 2, acoustic sensors 220(I) and 220(J) may be positioned on neckband 205, thereby increasing the distance between the neckband acoustic sensors 220(I) and 220(J) and other acoustic sensors 220 positioned on eyewear device 202.

In some cases, increasing the distance between acoustic sensors 220 of the microphone array may improve the accuracy of beamforming performed via the microphone array. For example, if a sound is detected by acoustic sensors 220(C) and 220(D) and the distance between acoustic sensors 220(C) and 220(D) is greater than, e.g., the distance between acoustic sensors 220(D) and 220(E), the determined source location of the detected sound may be more accurate than if the sound had been detected by acoustic sensors 220(D) and 220(E).

Controller 225 of neckband 205 may process information generated by the sensors on neckband 205 and/or AR system 200. For example, controller 225 may process information from the microphone array that describes sounds detected by the microphone array. For each detected sound, controller 225 may perform a DoA estimation to estimate a direction from which the detected sound arrived at the microphone array.

As the microphone array detects sounds, controller 225 may populate an audio data set with the information. In embodiments in which AR system 200 includes an inertial measurement unit, controller 225 may compute all inertial and spatial calculations from the IMU located on eyewear device 202. Connector 230 may convey information between AR system 200 and neckband 205 and between AR system 200 and controller 225. The information may be in the form of optical data, electrical data, wireless data, or any other transmittable data form. Moving the processing of information generated by AR system 200 to neckband 205 may reduce weight and heat in eyewear device 202, making it more comfortable to the user.

Power source 235 in neckband 205 may provide power to eyewear device 202 and/or to neckband 205. Power source 235 may include, without limitation, lithium ion batteries, lithium-polymer batteries, primary lithium batteries, alkaline batteries, or any other form of power storage. In some cases, power source 235 may be a wired power source. Including power source 235 on neckband 205 instead of on eyewear device 202 may help better distribute the weight and heat generated by power source 235.

As noted, some artificial reality systems may, instead of blending an artificial reality with actual reality, substantially replace one or more of a user's sensory perceptions of the real world with a virtual experience. One example of this type of system is a head-worn display system, such as VR system 300 in FIG. 3, that mostly or completely covers a user's field of view. VR system 300 may include a front rigid body 302 and a band 304 shaped to fit around a user's head. VR system 300 may also include output audio transducers 306(A) and 306(B). Furthermore, while not shown in FIG. 3, front rigid body 302 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 200 and/or VR system 300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 200 and/or VR system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 100, AR system 200, and/or VR system 300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 1 and 3, output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 110 may include condenser microphones, dynamic microphones, ribbon microphones, and/or any other type or form of input transducer. In some embodiments, a single transducer may be used for both audio input and audio output.

Figure 3:
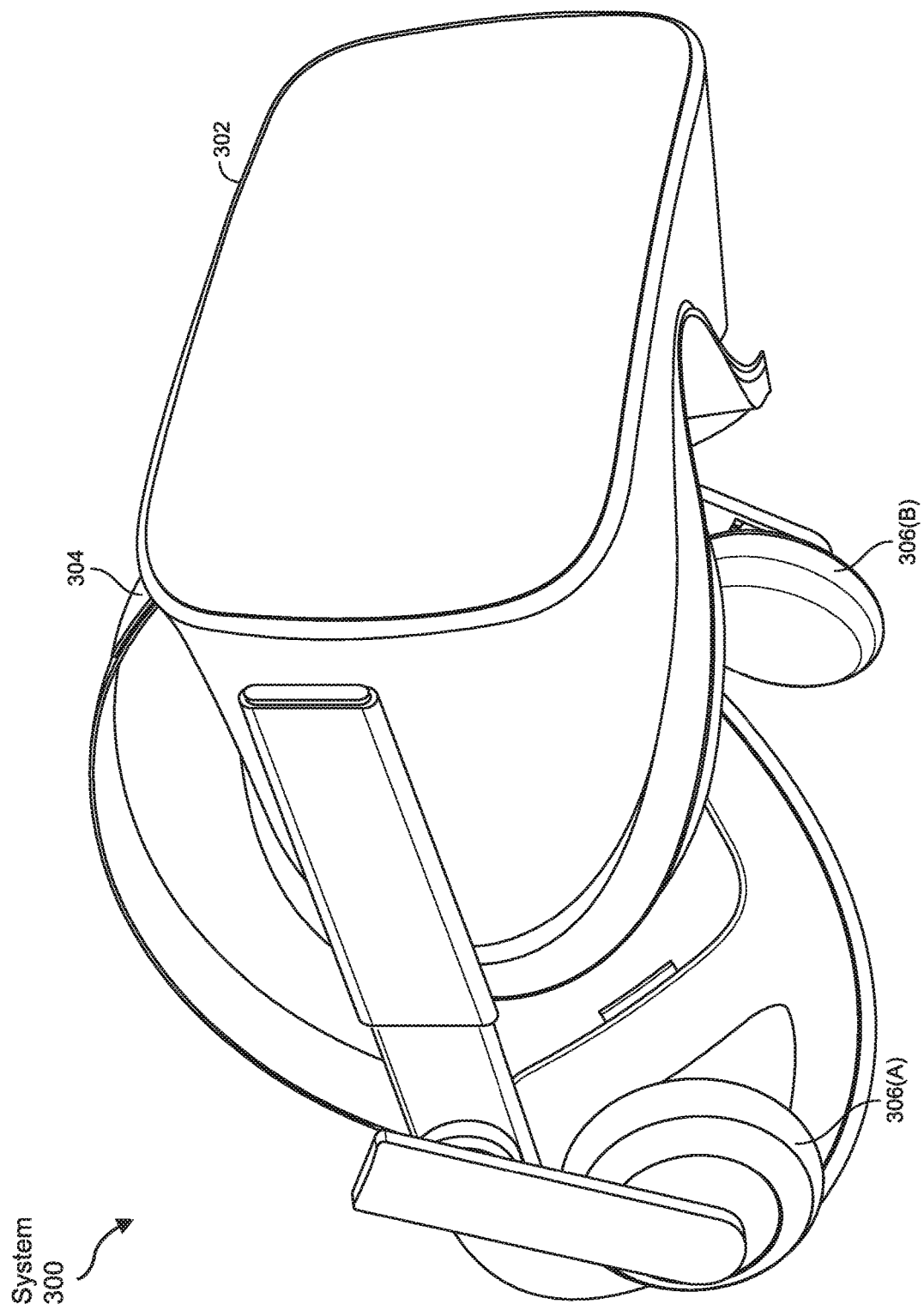
FIG. 3 is an illustration of an exemplary virtual reality (VR) system.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world.

Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Some artificial reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment.

AR and VR devices (such as systems 100, 200, and 300 of FIGS. 1-3, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

Figure 4:
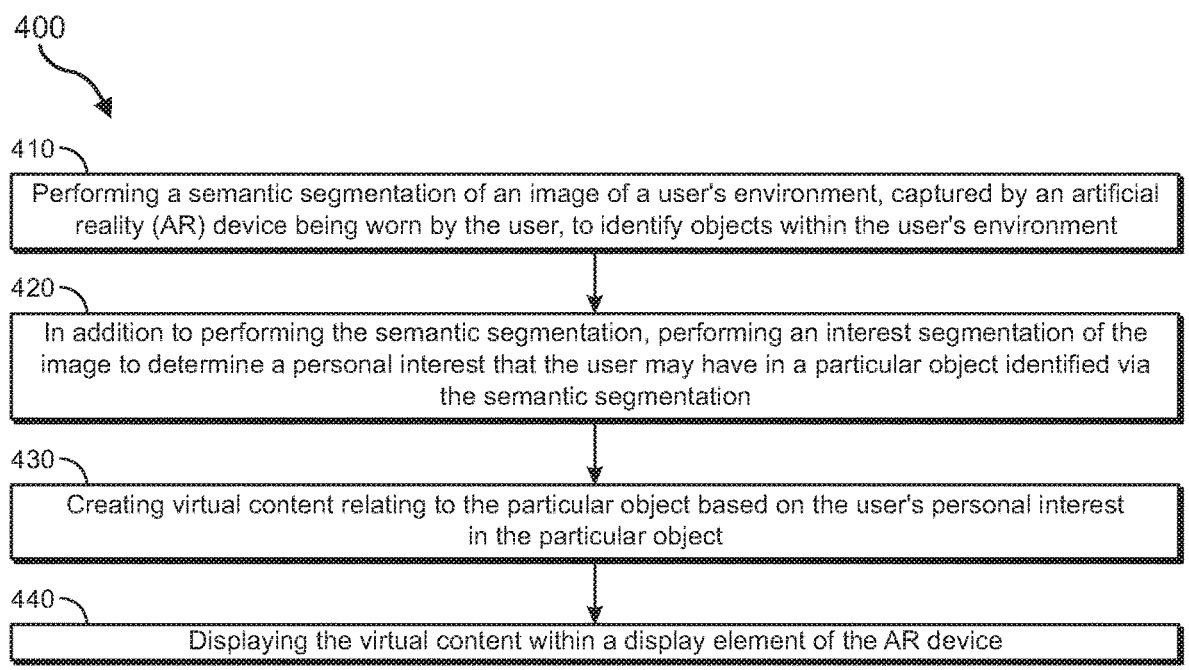
FIG. 4 is an illustration of a flow diagram of an exemplary method for performing an interest segmentation to generate virtual content for an AR device.

The following will provide, with reference to FIG. 4, detailed descriptions of computer-implemented methods for (1) performing an interest segmentation and (2) generating virtual content based on the results of the interest segmentation. Detailed descriptions of corresponding example systems (e.g., AR system 500) will also be provided in connection with FIG. 5. In addition, detailed descriptions of exemplary embodiments of the disclosed systems and methods will be provided in connection with FIG. 6.

FIG. 4 is a flow diagram of an exemplary computer-implemented method 400. The steps shown in FIG. 4 may be performed by any suitable computer-executable code and/or computing system, such as the systems described herein. In one embodiment, the steps shown in FIG. 4 may be performed by modules operating within a computing device capable of reading computer-executable instructions, such as computing device 502 and/or AR device 504 in FIG. 5. In some embodiments, each of the modules may operate within a single device. In other embodiments, the modules may be spread out across multiple devices.

Computing device 502 may represent any type or form of device capable of reading computer-executable instructions. In some examples, computing device 502 may represent a backend computing device. For example, computing device 502 may represent a server maintained by an AR platform that performs one or more AR functions (including, for example, collecting user data such as eye-tracking data, creating personalized profiles for users, and/or generating and/or transmitting virtual content to AR devices based on the personalized profiles). In another example, computing device 502 may represent a client device (e.g., used to receive user input indicating one or more preferences of the user and/or user input granting permission for certain operations).

AR device 504 may represent any type or form of device, capable of reading computer-executable instructions, that performs one or more artificial reality functions. In one example, AR device 504 may represent a wearable device with a display element (e.g., a head-mounted display) that presents virtual stimuli (e.g., virtual visual stimuli) to a user. Exemplary embodiments of AR device 504 include, without limitation, AR system 100 in FIG. 1, AR system 200 in FIG. 2, and VR system 300 in FIG. 3.

Figure 5:
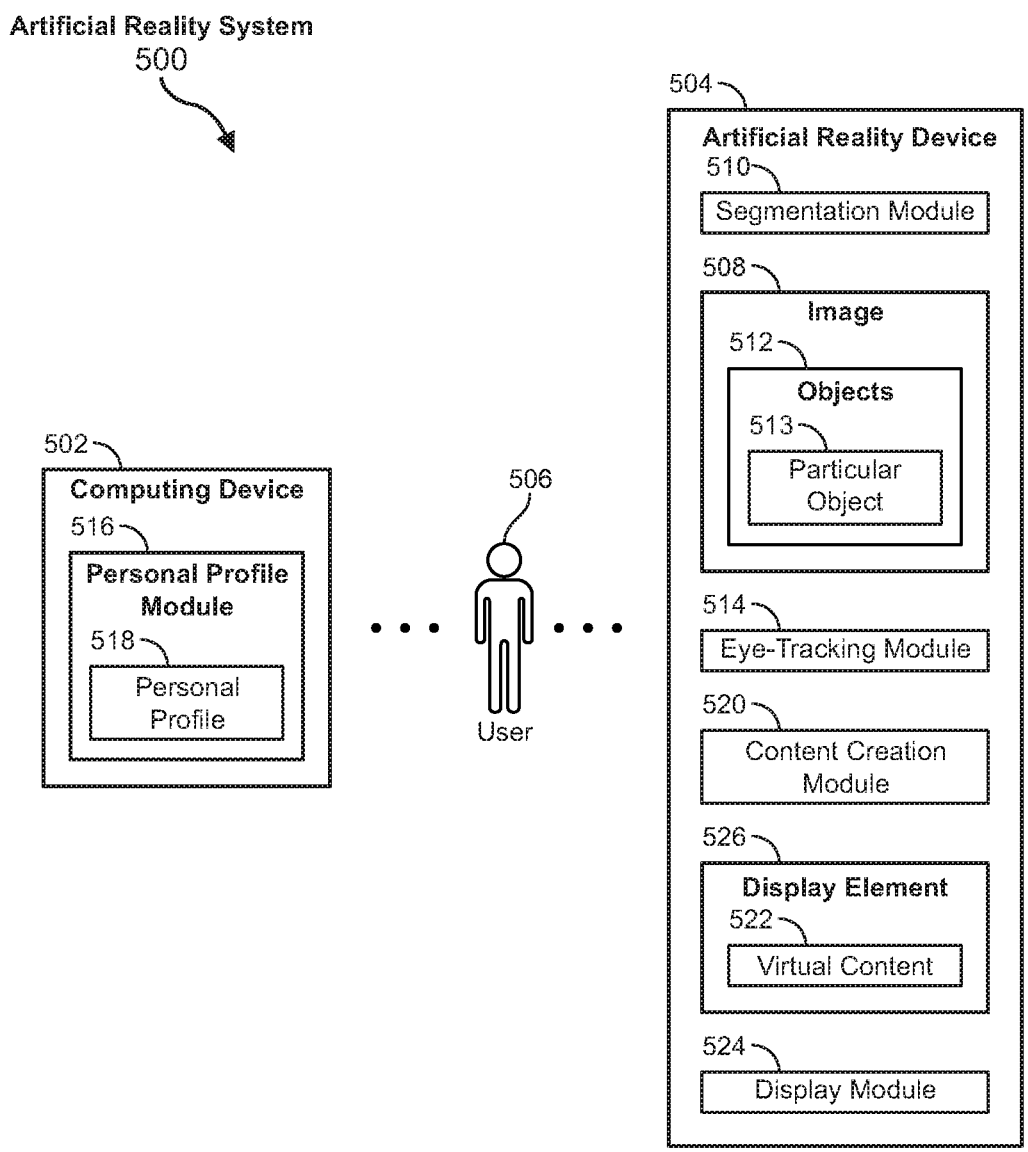
FIG. 5 is a block diagram of an exemplary system for performing an interest segmentation to generate virtual content for an AR device.

As illustrated in FIG. 4, at step 410, one or more of the systems described herein may perform a semantic segmentation of an image of a user's environment, captured by an AR device being worn by the user, to identify objects within the user's environment. For example, as illustrated in FIG. 5, AR device 504 may be worn by a user 506 and may capture an image 508 of user 506's real-world environment (e.g., an image of a portion of the environment within user 506's field of view). Then, a segmentation module 510 may perform a semantic segmentation of image 508 to identify and label objects 512 within the environment.

The term "semantic segmentation" may refer to any type or form of digital process for identifying which objects are captured in an image. A semantic segmentation process may include partitioning a digital image by associating each pixel within the digital image with a class label (e.g., tree, child, sandwich, guitar, etc.). As a specific example, at the time of step 410, user 506 may be located in a real-world environment 600 (depicted in FIG. 6) and AR device 504 may capture an image of environment 600. Then, segmentation module 510 may analyze the image to identify the various objects included within the image (e.g., coffee shop 602, sidewalk 604, man 606 next to bicycle 608, chimney 610, cloud 612, road 614, etc.).

Segmentation module 510 may identify and label objects 512 in a variety of ways. In some examples, segmentation module 510 may identify and label objects 512 using deep learning. In one such example, segmentation module 510 may include an encoder network and a decoder network. The encoder network may represent a pre-trained classification network. The decoder network may semantically project the features learned by the encoder network to the pixel space of image 508 to classify objects 512. The decoder network may utilize a variety of approaches to classify objects 512 (e.g., a region-based approach, a fully convolutional network (FCN) approach, etc.).

In addition to performing a semantic segmentation of the image of the user's environment, one or more of the systems described herein may perform an interest segmentation of the image to determine a personal interest that the user may have in a particular object identified via the semantic segmentation (step 420 in FIG. 4). For example, as illustrated in FIG. 5, segmentation module 510 may perform an interest segmentation of image 508 to determine a personal interest that user 506 may have in one or more of objects 512. In this example, segmentation module 510 may determine (e.g., predict) that user 506 may have a personal interest in a particular object 513. The term "interest segmentation" may refer to any type or form of digital process for identifying a personal interest that a user may have in an object identified via a semantic segmentation process.

Segmentation module 510 may determine that user 506 has a variety of different kinds of personal interest in particular object 513. In one example, segmentation module 510 may determine that particular object 513 is a type of object in which user 506 is interested. As a specific example, user 506 may be interested in guitars and particular object 513 may represent a guitar.

In another example, segmentation module 510 may determine that particular object 513 belongs to user 506 (e.g., a set of keys that belong to user 506). Additionally or alternatively, segmentation module 510 may determine that user 506 has interacted with particular object 513 more than a threshold amount (e.g., more than a threshold number of times, a threshold cumulative amount of time, and/or a threshold frequency). As a specific example, particular object 513 may represent a particular tree that user 506 always stops to look at when he walks through a particular park. In this specific example, the personal interest identified and/or predicted by segmentation module 510 may be that particular object 513 always attracts the gaze of user 506.

As another example, segmentation module 510 may determine that particular object 513 relates to another person, place, or thing that interests user 506. As a specific example, user 506 may have an interest in 20th-century American literature and particular object 513 may represent a home that was once inhabited by a famous $20^{th}$-century American author.

Segmentation module 510 may predict user 506's personal interest in particular object 513 (that is, may perform the interest segmentation) based on one or more of a variety of factors, or on any relevant combination of factors. In one example, these factors may include user 506's historical eye-tracking data (e.g., collected by AR device 504 while being worn by user 506). In this example, segmentation module 510 may operate based on a setting and/or policy that objects that have attracted a user's gaze (e.g., eye-gaze) in the past are predictive of what will interest the user in the future. Additionally or alternatively in this example, segmentation module 510 may operate based on a setting and/or policy that a particular object that has historically attracted a user's gaze (e.g., eye-gaze) more than a threshold amount belongs to the user and/or has a particular significance to the user.

As a specific example, AR device 504 may have collected eye-tracking data indicating that user 506 has visually focused on a particular type of object (e.g., butterflies) more than a threshold amount. In this specific example, particular object 513 may represent the particular type of object (e.g., a butterfly) and segmentation module 510 may determine that user 506 may be interested in particular object 513 based on user 506 having visually focused on the particular type of object (e.g., butterflies) more than a threshold amount in the past.

As another specific example, AR device 504 may have collected eye-tracking data indicating that user 506 has visually focused on particular object 513 itself in the past more than a threshold amount. In this specific example, segmentation module 510 may determine that particular object 513 belongs to user 506, and/or that particular object 512 has a particular significance to user 506, based on user 506 having visually focused on particular object 513 in the past more than the threshold amount.

Figure 6:
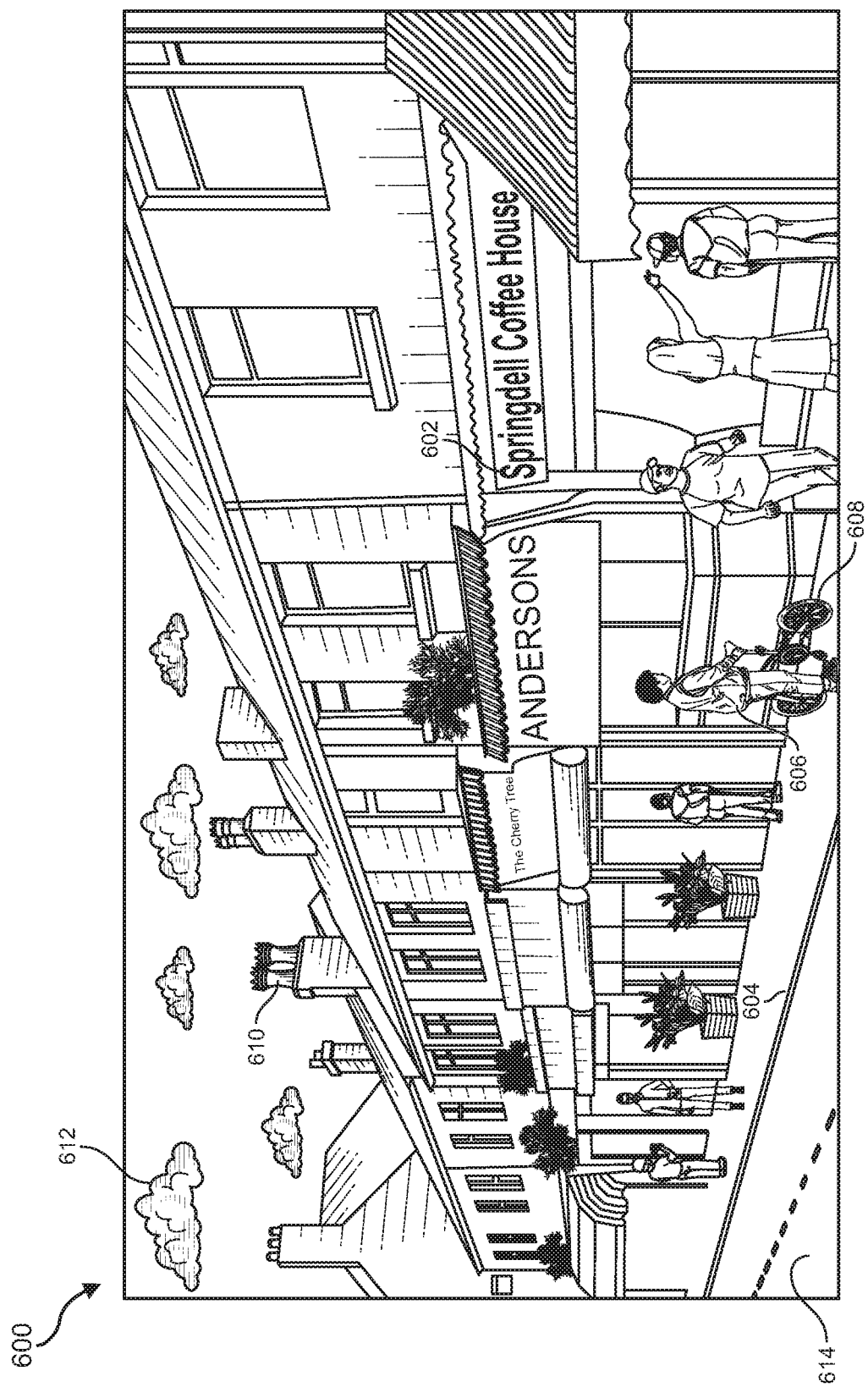
FIG. 6 is an illustration of an exemplary real-world scene that may be captured by an AR device and which may be the subject of an interest segmentation.

In a related embodiment, the factors influencing the interest segmentation may include eye-tracking data indicating a current eye-gaze of user 506 (e.g., which may be shown in heat map generated based on the user's eye-tracking data). In this embodiment, user 506's current eye gaze may be focused on particular object 513. Additionally or alternatively, user 506's current eye gaze may express a gaze pattern that indicates that user 506 may be interested in particular object 513. FIG. 6 may be used as a specific example of a gaze pattern that indicates a potential interest in particular object 513. In this specific example, AR device 504 may collect eye-tracking data indicating that user 506 is visually scanning along the store front abutting sidewalk 604 (e.g., after having recently used a GPS application to search for "Café Quotidien" and/or at a time during which user 506 normally has a coffee). Then, based at least in part on this eye-tracking data, segmentation module 510 may determine that user 506 may have an interest in coffee shop 602.

In some examples, the user's historical or current eye-tracking data may be collected by an eye-tracking module 514 of AR device 504. Eye-tracking module 514 may identify user 506's eye-tracking using any type or form of eye-tracking technology. For example, eye-tracking module 514 may rely on a device embedded in and/or functioning in connection with AR device 504 to transmit light from a light source (such as infrared light from an infrared emitter) at the eyes of user 506. In this example, eye-tracking module 514 may rely on one or more sensors embedded within AR device 504 to identify a reflection of the light source from the eyes. Then, eye-tracking module 514 may analyze the reflection to determine the direction of the user's eye-gaze. In one example, eye-tracking module 514 may identify pixel coordinates, on a display element of AR device 504, at which user 506 is gazing. Then, eye-tracking module 514 may detect an object corresponding to the pixel coordinates (e.g., an object that was identified and labeled via a semantic segmentation process) and determine that user 506 is gazing at the detected object.

In some embodiments, the factors influencing the interest segmentation may include data describing an interaction that user 506 has had with an object. In some examples, the data describing the interaction may be collected by AR device 504. For example, AR device 504 may record eye-tracking data (e.g., using eye-tracking module 514) and/or haptic data (e.g., using a haptic device that operates as part of or in connection with AR device 504) revealing user 506 handling one or more objects (e.g., a certain phone). In additional or alternative examples, the data describing the interaction may be recorded by a device that operates in connection with AR device 504 (e.g., within an Internet of Things (IoT) system). As a specific example, a smart toaster within a same IoT system as AR device 504 may record that user 506 toasts a bagel every morning at around 6 am.

In some examples, the factors influencing the interest segmentation may include data (e.g., historical eye-tracking data) of one or more additional users (e.g., users with a particular similarity or bundle of similarities to user 506). As a specific example, user 506 may identify as a guitar enthusiast and segmentation module 510 may at least partially base its interest determination for user 506 on the eye-tracking data of other guitar enthusiasts (e.g., an object visually looked at or physically handled by other guitar enthusiasts may be predicted to be of interest to user 506). In some examples, the additional users may be selected (i.e., users predicted to have a similarity to user 506 may be selected) based on a personal profile of user 506 using machine learning.

Additional factors that may influence the interest segmentation may include, without limitation, GPS data associated with user 506, URL browsing data associated with user 506, a digital purchase history of user 506, a travel history of user 506, digital content generated by user 506 (e.g., email content, calendar content, social media content, etc.), and/or user preference data submitted by user 506 (e.g., submitted as part of a registration process and/or as part of setting up a personal profile).

In certain embodiments, one or more ephemeral factors (e.g., factors predicted to be affecting a current state of user 506) may influence the interest segmentation. Such ephemeral factors may include, without limitation, a time of day, a recent activity of the user, and/or a current activity of user 506. Using FIG. 6 as a specific example, the interest segmentation may predict that user 506 is likely to have an interest in coffee shop 602 in the morning as he is heading to work but is unlikely to have an interest in coffee shop 602 in the evening after eating dinner.

In one embodiment, an ephemeral factor may include ephemeral physiological data (e.g., heart-rate and/or brain wave data) collected by a sensor that monitors user 506's physiologic state (e.g., a sensor embedded within AR device 504). In some examples, the physiological data may be used to deduce an emotional state of user 506, which may be used as part of the interest segmentation. In additional or alternative examples, an emotional state may be identified via user input.

Segmentation module 510 may use the factors described above to perform the interest segmentation in a variety of ways. In some examples, segmentation module 510 may perform the interest segmentation using a neural network. In these examples, one or more of the factors described above may serve as inputs to the neural network. In other examples, segmentation module 510 may perform the interest segmentation using one or more rigid rules in a policy. A specific example of a rigid rule may include a rule to flag, as a personally significant object, any object that has attracted a user's gaze more than a predetermined amount in the past.

In one example, a personal profile module 516 may have created a personal profile 518 for user 506. Personal profile 518 may be generated based on a variety of factors, such as the factors described above. This personal profile may then be used to perform the interest segmentation. In some embodiments, personal profile 518 may be generated and/or maintained by a backend server. In other embodiments, personal profile 518 may be generated and/or maintained by AR device 504.

The factors described above are intended to be illustrative of exemplary types of factors that may be used as part of an interest segmentation. Segmentation module 510 may use any of the described factors, either in isolation or in combination, to perform an interest segmentation. In some examples, segmentation module 510 may rely on a combination of factors that includes one or more of the factors described above together with one or more additional factors not explicitly described herein.

Returning to FIG. 1, at step 430, one or more of the systems described herein may create virtual content relating to the particular object based on the user's personal interest in the particular object. For example, as illustrated in FIG. 5, a content creation module 520 may create virtual content 522 relating to particular object 513.

Virtual content 522 may represent any type of computer-generated content configured to be visually displayed via a display element 526 of AR device 504. Virtual content 522 may take a variety of different forms (e.g., a digital graphic, a filter, and/or text) and may communicate a variety of different information, depending on the kind of interest user 506 is predicted to have in particular object 513.

In some examples, virtual content 522 may include content configured to draw user 506's attention to particular object 513. Using FIG. 6 as a specific example, particular object 513 may represent a coffee house (i.e., coffee shop 602) and segmentation module 510's interest segmentation may have predicted that user 506 may be interested in coffee shop 602 (e.g., based on data indicating that user 506 usually drinks coffee at this time, eye-tracking data indicative of user 506 scanning his environment looking for something, and/or data indicating that users who match a profile of user 506 rate coffee shop 602 highly). In this specific example, content creation module 520 may be configured to create content (e.g., a digital graphic of a cup of coffee) that draws user 506's attention to coffee shop 602 based on the results of the interest segmentation.

In one embodiment, virtual content 522 may include content that provides information about particular object 513 (e.g., historical information, hours of operation, consumer ratings, how-to information, interesting facts, etc.). As a specific example, particular object 513 may represent a particular tree in a park and eye-tracking module 514 may have collected eye-tracking data indicating that user 206 has gazed at the particular tree more than a threshold amount. In this example, content creation module 520 may be configured to create content describing a common and/or scientific name of the tree, based on an interest segmentation that suggests user 506's interest in the tree based on user 506's historical eye-tracking data.

As another specific example, particular object 513 may represent the pump filter of a washing machine and eye-tracking module 514 may have collected eye-tracking data indicating that user 506 has opened the back of the washing machine and is handling the pump filter. In this example, content creation module 520 may be configured to create content relating to how to clean and/or replace a pump filter, based on an interest segmentation that suggests that user 506 may be attempting to clean and/or replace the pump filter.

In some examples, virtual content 522 may include content that provides information about a location of particular object 513. In these examples, virtual content 522 may indicate a location of particular object 513 within the environment and may be created in response to a determination that user 506 has lost particular object 513. For example, segmentation module 510 may have determined a location of particular object 513 at a first moment in time during which particular object 513 is within user 506's field of view, while user 506 was wearing AR device 504 (e.g., while segmentation module 510 was performing the semantic segmentation and the interest segmentation). Then, at a second moment in time, user 506 may be determined to have lost particular object 513. In response to this determination, content creation module 520 may create virtual content that indicates the location of particular object 513 at the first moment in time. In this example, virtual content 522 may include text describing the location (e.g., the text "your keys may be on your kitchen counter") or a visual image (captured at the first moment in time) showing the last known location of particular object 513 (e.g., an image of keys on a kitchen counter).

In one example, virtual content 522 may include a reminder. As a specific example, segmentation module 510 may have identified a paper on a kitchen counter via the semantic segmentation in step 410. Then, (at step 420) segmentation module 510 may have determined that the paper is a bill that is past due. (This determination may be based on data collected by AR device 504 at a previous time during which user 506 had the contents of the paper within AR device 504's field of view). In this example, virtual content 522 may include a reminder to pay the bill.

Content creation module 520 may create virtual content 522 in response to a variety of events. In some embodiments, content creation module 520 may automatically create virtual content 522 in response to a policy-driven trigger, without any prompting from user 506 for the same. Such a trigger may include, without limitation, a prediction that an object within user 506's field of view may be of interest to the user and/or a prediction or determination that user 506 has lost an object. In other embodiments, virtual content 522 may be created in response to receiving user input requesting the same (e.g., a user request for information relating to the location of a lost object, a user request to identify a nearby coffee house, a user request to receive a virtual reminder, etc.).

In some examples, content creation module 520 may rely on machine learning to identify content that is likely to be of interest to the user (e.g., based on the factors described above in connection with step 420). In one such example, a neural network may (1) identify a personal significance that an object in user 506's environment may have to user 506 (as part of the interest segmentation in step 420) and then (2) identify content (related to the object) that may be of interest to user 506 (as part of the content creation in step 430). As a specific example, a neural network may (1) determine that a sycamore tree in user 506's environment is likely to be of interest (e.g., based on user 506's historical interest in the tree) and (2) determine that a poem written about sycamore trees may be of interest to user 506 (e.g., based on a determination that user 506 is interested in poetry).

Returning to FIG. 4, after creating the virtual content, one or more of the systems described herein may display the virtual content within a display element of the AR device. For example, as illustrated in FIG. 5, display module 524 may display virtual content 522 via display element 526 of AR device 504.

Display module 524 may display virtual content 522 in a variety of ways. In some examples, display module 524 may display virtual content 522 in a manner that visually associates virtual content 522 with particular object 513. For example, display module 524 may display virtual content 522 such that virtual content 522 is superimposed over particular object 513 within display element 526 and/or hovers substantially above, below, or to the side of particular object 513 within a predetermined distance of particular object 513. In this example, display module 524 may display virtual content 522 at pixel coordinates within a screen of display element 526 that correspond to particular object 513 within user 506's environment (e.g., that correspond to an area that superimposes particular object 513 or hovers above, below or to the side of particular object 513).

Display module 524 may display virtual content 522 via a variety of physical elements. For example, display module 524 may display virtual content 522 using one or more components of AR device 504 in FIG. 5, AR system 100 in FIG. 1, AR system 200 in FIG. 2, and/or VR system 300 in FIG. 3. Using FIG. 2 as a specific example, display module 524 may display virtual content 522 via left display device 215(A) and/or right display device 215(B) in AR system 200.

Each component (e.g., each step and/or sub-step) of method 400 may be performed in response to receiving user permission to do so (e.g., where a component is not performed in the absence of such permission). In one example, the disclosed systems and methods may include a permissions process for obtaining the user's permission. During this process, a description of each component may be digitally presented to a user (e.g., user 506 in FIG. 5) and the user may select which of the components to permit. In one embodiment, components may be bundled together and presented to the user as a bundle and/or a series of bundles, allowing the user to grant or deny permission to any given bundle. In another embodiment, each component may be individually presented to the user, allowing the user to grant or deny permission to each individual component. In the absence of a selection to grant permission (that is to opt-in) to a particular component or bundle of components, a default permission-denial may be selected on behalf of the user.

In one embodiment, the permissions process may be performed ex ante (e.g., permission to perform an operation may be digitally solicited and received from the user prior to performing the operation). In this embodiment, the user's permission may be general (e.g., the user may be given the option to allow a type of operation to be performed). Specific examples of a general permission may include, without limitation, permission to create a personalized profile, permission to collect eye-tracking data, permission to add the user's data to an aggregate database, permission to create and display personalized virtual content to the user, etc.

Additionally or alternatively, the permissions process may be performed post hoc. In this embodiment, the user's permission may be specific (e.g., the user may be given the option to allow a specific piece of data to be collected). As a specific example of a post-hoc permissions process, the user may be digitally transmitted a periodic summary of data collected relating to him or her (e.g., a daily summary, a weekly summary, a monthly summary, etc.). Specific examples of such data may include eye-tracking data, browsing history, and/or GPS data collected during the period (e.g., collected by the user's AR device and/or by an additional device such as a smartphone or a laptop).

The user may grant permission for the summarized data to be used in a variety of different ways. For example, the user may grant permission to allow the data to (1) be transmitted from the user's AR device and/or additional device to a backend server, (2) be used to perform an operation (such as creating a personalized profile), and/or (3) be anonymized and added to an aggregate databased including the anonymized data of many different users. In some examples, the user may customize which uses he or she permits, allowing some and denying others if desired.

As described throughout the present disclosure, the disclosed systems and methods may provide systems and methods for delivering personalized virtual content to a user of an AR device, such as a pair of AR glasses, who has opted-in to receiving personalized information. In some examples, the personalized content may relate to a particular object within the user's environment predicted or known to be of interest to the user (e.g., based on the particular object being of a particular type and/or based on the particular object belonging to the user and/or having a personal significance to the user). In these examples, the disclosed systems and methods may perform a semantic segmentation of the user's environment to determine which objects are included in the user's environment and an interest segmentation to determine a significance that one of more of the objects may have to the user. Then, the disclosed systems and methods may generate and display content created based on the results of the interest segmentation.

In some examples, the personalized content may be passively presented to the user. That is, the content may be presented without explicit user request for the same. As an example, the AR device may present the content in response to detecting certain objects in the user's environment. In other examples, the personalized content may be presented to the user in response to receiving a user query for the same.

The disclosed systems and methods may identify objects of personal significance and select content to display to the user based on a variety of inputs. For example, in some examples, the user may have opted-in to the AR device collecting eye-gazing and/or hand-tracking data. In these examples, the objects may be identified, and/or the content may be selected, based on the eye-gazing and/or the hand-tracking data collected by the AR device.

In some embodiments, the user may have opted-in to receiving context-driven predicted content. In these embodiments, the identified objects and/or the selected content may vary based on contextual factors, such as a time of day and/or an activity the user is engaged in. In one embodiment, the user may have opted-in to allowing the AR device to deduce the user's emotional state (e.g., based on physiologic data collected by the AR device). In this example, predictions may be based on the user's current emotional state.

In some embodiments, a personalized profile may be created for the user based on the inputs that the user has opted-in to providing. In one such embodiment, anonymized data of other users may be collected via crowd surfing and used to predict objects and/or content that may be of interest to the user. For example, a user may be categorized into a group based on one or more inputs to the user's personalized profiles and the data of other users within the group may be used to predict what content will be of interest to the user.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" may refer to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" may, in some examples, refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may, in some examples, refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    performing a semantic segmentation of an image of a user's environment, captured by an artificial reality (AR) device being worn by the user, to identify objects within the user's environment;
    in addition to performing the semantic segmentation, performing an interest segmentation of the image to identify a personal significance that a particular object, identified via the semantic segmentation, may have to the user;
    creating virtual content relating to the particular object based on the identified personal significance of the particular object to the user; and
    displaying the virtual content within a display element of the AR device.

2. The computer-implemented method of claim 1, wherein performing the interest segmentation comprises:
    identifying a type of object corresponding to the particular object; and
    determining that the user is interested in the type of object.

3. The computer-implemented method of claim 2, wherein the virtual content comprises content configured to draw the user's attention to the particular object.

4. The computer-implemented method of claim 1, wherein identifying the personal significance comprises determining that at least one of:
    the particular object belongs to the user; or
    the user has interacted with the particular object more than a threshold amount.

5. The computer-implemented method of claim 4, wherein:
    the virtual content is created and displayed in response to determining that the user has lost the particular object; and
    the virtual content is configured to indicate a location of the particular object within the environment.

6. The computer-implemented method of claim 5, wherein:
    the semantic and interest segmentations are performed at a first moment in time, during which the user wearing the AR device is within the environment while wearing the AR device; and
    the user is determined to have lost the particular object at a second moment in time during which the user is no longer within the environment.

7. The computer-implemented method of claim 1, wherein the interest segmentation is based on at least one of:
    the user's historical eye-tracking data; or
    historical eye-tracking data of one or more additional users with a particular similarity or bundle of similarities to the user.

8. The computer-implemented method of claim 1, wherein the interest segmentation is based on a heatmap of the environment comprising the user's eye-tracking data with respect to the environment.

9. The computer-implemented method of claim 1, wherein the interest segmentation is based on at least one of:
    GPS data associated with the user;
    URL browsing data associated with the user; or
    user-submitted data submitted by the user.

10. The computer-implemented method of claim 1, wherein the interest segmentation is based on an interaction of the user recorded by an additional device within an Internet of Things (IoT) system that comprises the AR device.

11. The computer-implemented method of claim 1, wherein the interest segmentation is based on data describing ephemeral factors predicted to be affecting a current state of the user.

12. The computer-implemented method of claim 11, wherein the ephemeral factors comprise at least one of:
    a time of day;
    an emotional state of the user;
    a physiological state of the user; or
    a current activity of the user.

13. The computer-implemented method of claim 1, wherein the interest segmentation is performed by a neural network.

14. The computer-implemented method of claim 1, wherein displaying the virtual content within the display element comprises displaying the virtual content such that the virtual content is superimposed over the particular object within the display element.

15. The computer-implemented method of claim 1, wherein the interest segmentation is performed and the virtual content is displayed in response to receiving permission from the user to perform the interest segmentation and display the virtual content.

16. A system comprising:
    a segmentation module, stored in memory, that:
        performs a semantic segmentation of an image of a user's environment, captured by an artificial reality (AR) device being worn by the user, to identify objects within the user's environment; and
        in addition to performing the semantic segmentation, performs an interest segmentation of the image to identify a personal significance that a particular object, identified via the semantic segmentation, may have to the user;
    a content creation module, stored in memory, that creates virtual content relating to the particular object based on the identified personal significance of the particular object to the user; and
    a display module, stored in memory, that displays the virtual content within a display element of the AR device; and
    at least one physical processor configured to execute the segmentation module, the content creation module, and the display module.

17. The system of claim 16, wherein the segmentation module performs the interest segmentation by:
    identifying a type of object corresponding to the particular object; and
    determining that the user is interested in the type of object.

18. The system of claim 17, wherein the virtual content comprises content configured to draw the user's attention to the particular object.

19. The system of claim 16, wherein the interest segmentation is based on at least one of:
- the user's historical eye-tracking data; or
- historical eye-tracking data of one or more additional users with a particular similarity or bundle of similarities to the user.

20. A non-transitory computer-readable medium comprising one or more computer-readable instructions that, when executed by at least one processor of a computing device, cause the computing device to:
- perform a semantic segmentation of an image of a user's environment, captured by an artificial reality (AR) device being worn by the user, to identify objects within the user's environment;
- in addition to performing the semantic segmentation, perform an interest segmentation of the image to identify a personal significance that a particular object, identified via the semantic segmentation, may have to the user;
- create virtual content relating to the particular object based on the identified personal significance of the particular object to the user; and
- display the virtual content within a display element of the AR device.

\* \* \* \* \*